Patented Nov. 9, 1948

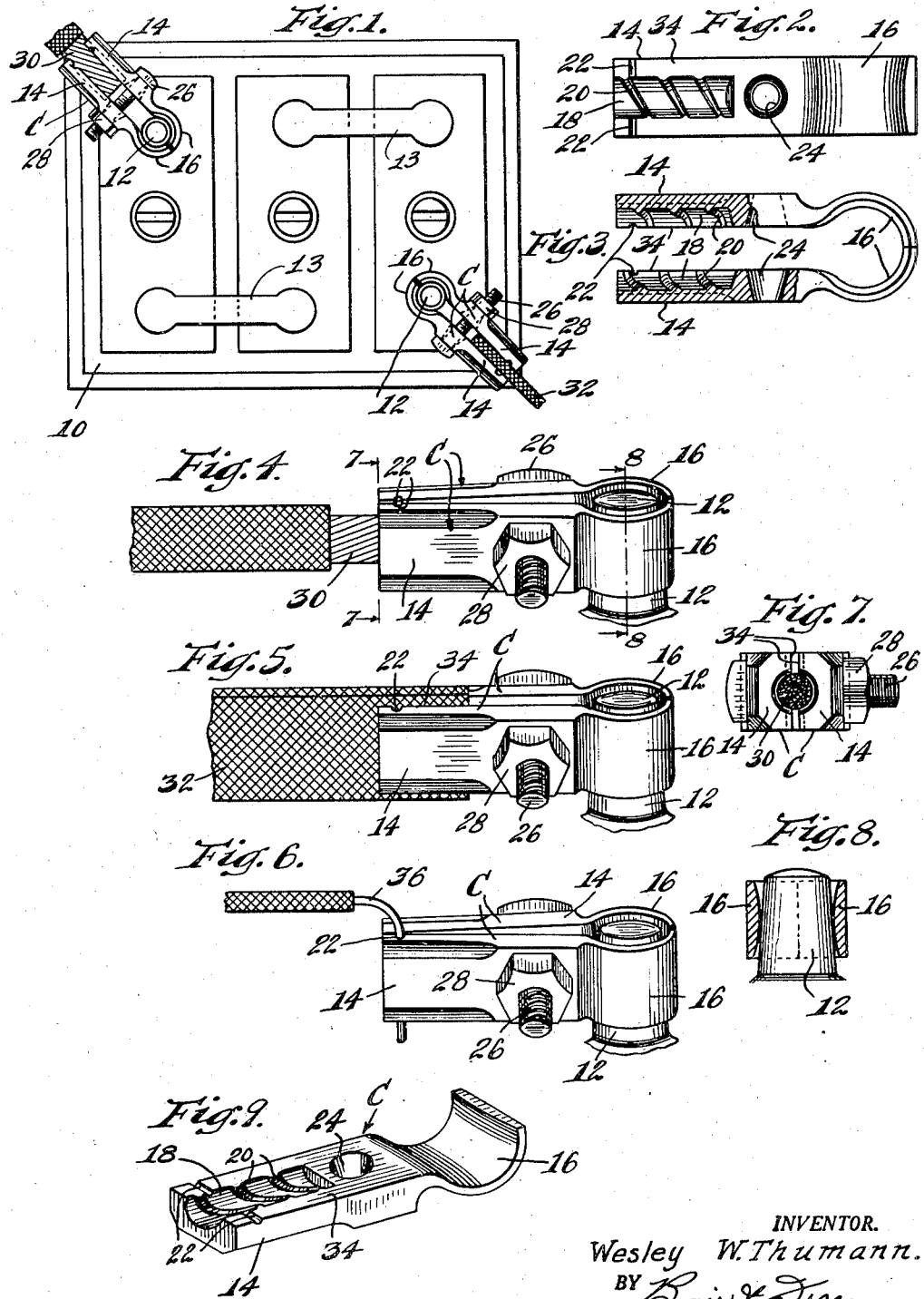

2,453,474

UNITED STATES PATENT OFFICE 2,453,474

BATTERY TERMINAL CLAMP

Wesley W. Thumann, Stuttgart, Ark.

Application December 4, 1944, Serial No. 566,417

2 Claims. (Cl. 173—259)

My invention relates to a clamp for storage battery terminals which is formed of a pair of clamp elements and a bolt, the bolt being effective when tightened to secure the clamp on a battery terminal and simultaneously on the end of a cable.

An object is to provide the clamp element so formed that round or flat cables can be gripped by the clamp, or a small single strand of wire may be gripped in a cross-groove thereof.

Another object is to provide the terminal engaging end of the clamp arranged with a double taper so that the clamp can be mounted either side up, as desired.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a plan view of a storage battery with two of my clamps mounted thereon, one engaging a round cable and the other a flat cable;

Fig. 2 is an inside elevation of one of the clamp elements;

Fig. 3 shows two of the clamp elements in their assembled relation to each other, portions of the elements being broken away and other portions thereof shown in section;

Figs. 4, 5 and 6 are perspective views showing the clamp applied to a round cable, a flat cable and a relatively small wire, respectively;

Fig. 7 is a sectional view on the line 7—7 of Fig. 4;

Fig. 8 is a sectional view on the line 8—8 of Fig. 4; and

Fig. 9 is a perspective view of one of the clamp elements per se.

On the accompanying drawing I have used the reference numeral 10 to indicate a storage battery which has the usual terminals 12. These are ordinarily tapered, as shown in Fig. 8, and are usually made of lead.

My battery terminal clamp consists of a pair of identical clamp elements C. Each clamp element C has an elongated body portion 14 and a hook portion 16. The hook portion 16 is formed convex on its inner surface, as shown in Fig. 8, so that it will fit the taper of the terminal 12 when the clamping element is mounted either side up.

The elongated body portion 14 is provided with a recess 18 in which spiral ribs 20 are formed. There is also a cross-groove 22 for a purpose which will hereinafter appear.

At approximately the center of the clamp element C is a tapered opening 24 adapted to receive a clamp bolt 26. A nut 28 is mounted on the clamp bolt.

Two of the clamp elements C shown in Fig. 9 are assembled face to face, as shown in Fig. 3, and when so assembled the beads 20 are in crosswise relation to each other. They accordingly provide a good grip on a round cable 30, as shown at the upper left-hand corner of Fig. 1 and in Figs. 4 and 7. When the nut 28 is tightened on the bolt 26, gripping is had between the hook-like portions 16 of the clamp elements and the cable 30 at the same time. Thus a single bolt accomplishes both purposes and eliminates the necessity of soldering the cable into the clamp.

Similarly, the clamp elements may be used for gripping a flat cable 32, as shown in Fig. 5, in which case the cable is gripped between the adjacent faces 34 of the body members 14. The flat cable 32 is the usual type provided as a ground connection for batteries in automobiles. If it is desirable to use the clamp for single or stranded wires, such as radios, lights, chargers and the like, the wire shown at 36 in Fig. 6 may be gripped between the cross-grooves 22.

From the foregoing description it is obvious that I have provided a battery terminal clamp which is inexpensive to manufacture and may be readily substituted for a damaged or corroded lug of the type usually provided on the ends of round and flat cables. The clamp may also be used to connect a small wire to the battery terminal with equal facility. Due to the clamping action other connections can also be made where the conductors are of shapes and sizes other than those illustrated.

It is also possible to make electrical connection to one of the battery straps 13 when less than the full battery capacity is to be used. The hook portions 16 will grip the top and bottom surfaces of the strap with a pincer or tong-like action when the lead wire or cable is inserted as in Figs. 4, 5 or 6 into the clamp and the nut 28 tightened.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a battery terminal clamp, a pair of identical clamping elements, said elements having registering holes intermediate their ends for reception of a bolt for securing the elements together, said elements when assembled forming a terminal hole transversely therethrough at one end thereof, the opposite ends of said elements having mating faces spaced apart when in parallel relation, said mating faces having registering longitudinal recesses formed therein for gripping a cable, said recesses having spiral ribs formed therein, and the ends of said mating faces opposite said terminal hole having registering cross-grooves of shallower dimension than said recesses.

2. In a battery terminal clamp, a pair of identical clamping elements, said elements having registering holes intermediate their ends for reception of a bolt for securing the elements together, said elements having cooperating hooks at one end thereof having free ends of said hooks fitted together, said hooks thereby forming a terminal hole being tapered from both ends toward the center, the opposite ends of said elements having mating faces, the free ends of said hooks being of such a length that said mating faces are spaced apart when in parallel relation, said mating faces having registering longitudinal recesses formed therein for gripping a cable, said recesses having spiral ribs formed therein, and the ends of said mating faces opposite said terminal hole having registering cross-grooves of shallower dimension than said recesses.

WESLEY W. THUMANN.

REFERENCES CITED

The following references are of record in the file of this patent:

UNITED STATES PATENTS

| Number | Name | Date |
|---|---|---|
| Re. 20,074 | Stahl | Aug. 16, 1936 |
| 1,094,717 | Hinde et al. | Apr. 28, 1914 |
| 1,312,947 | Billington | Aug. 12, 1919 |
| 1,787,906 | Hoover | Jan. 6, 1931 |
| 1,847,021 | Plachy | Feb. 23, 1932 |
| 1,891,920 | Eaton | Dec. 27, 1932 |
| 2,020,220 | Smith | Nov. 5, 1935 |
| 2,040,250 | Eulberg | May 12, 1936 |
| 2,087,194 | Jordan | July 13, 1937 |
| 2,216,344 | Hampton | Oct. 1, 1940 |
| 2,381,938 | Tenney | Aug. 14, 1945 |

FOREIGN PATENTS

| Number | Country | Date |
|---|---|---|
| 191,972 | France | June 23, 1888 |
| 397,207 | Great Britain | Aug. 24, 1933 |
| 754,926 | France | Sept. 4, 1933 |